(12) United States Patent
Gaillard et al.

(10) Patent No.: US 11,541,615 B2
(45) Date of Patent: Jan. 3, 2023

(54) FIBER APPLICATION HEAD COMPRISING HEATING MEANS ASSOCIATED WITH FUNCTIONAL MODULES

(71) Applicant: CORIOLIS GROUP, Quéven (FR)

(72) Inventors: Loïc Gaillard, Lanester (FR); Johan Berlaud, Lorient (FR)

(73) Assignee: Coriolis Group, Queven (FR)

( * ) Notice: Subject to any disclaimer, the term of this patent is extended or adjusted under 35 U.S.C. 154(b) by 0 days.

(21) Appl. No.: 17/050,814

(22) PCT Filed: Apr. 23, 2019

(86) PCT No.: PCT/FR2019/000060
§ 371 (c)(1),
(2) Date: Oct. 26, 2020

(87) PCT Pub. No.: WO2019/207216
PCT Pub. Date: Oct. 31, 2019

(65) Prior Publication Data
US 2021/0229375 A1 Jul. 29, 2021

(30) Foreign Application Priority Data

Apr. 25, 2018 (FR) ...................................... 1800446

(51) Int. Cl.
*B29C 70/38* (2006.01)
*B29C 70/54* (2006.01)

(52) U.S. Cl.
CPC ............ *B29C 70/384* (2013.01); *B29C 70/54* (2013.01)

(58) Field of Classification Search
CPC ...... B29C 2035/0838; B29C 2035/046; B29C 70/54; B29C 70/384
See application file for complete search history.

(56) References Cited

U.S. PATENT DOCUMENTS

| 4,285,752 A | 8/1981 | Higgins |
| 2017/0095985 A1 | 4/2017 | Engel et al. |
| 2021/0094245 A1 | 4/2021 | Gaillard et al. |

FOREIGN PATENT DOCUMENTS

| EP | 2134532 | 12/2009 |
| EP | 2594389 | 5/2013 |

(Continued)

OTHER PUBLICATIONS

Machine translation of WO 2017/072418 A1; Inventor: Alexander Hamyln; Publication: May 4, 2017.*

(Continued)

*Primary Examiner* — Vishal I Patel
(74) *Attorney, Agent, or Firm* — Patterson Thuente, P.A.

(57) ABSTRACT

A fiber application head comprising a compaction system including a plurality of independent compaction rollers and compaction cylinders and, for each fiber, cutting means and rerouting means. For each fiber, the head comprises a functional module including the cutting means and the rerouting means, each functional module is mounted so as to be movable in translation on a support element of the head. Each compaction roller is mounted on one or more adjacent functional modules. A compaction cylinder is associated with the functional module(s) associated with a compaction roller for the displacement in translation of the functional module(s). An independent heating system is associated with each compaction roller, and able to displace with the functional module(s) associated with a compaction roller.

5 Claims, 6 Drawing Sheets

(56) References Cited

FOREIGN PATENT DOCUMENTS

| EP | 2594389 A1 * | 5/2013 | ............. B29C 70/38 |
|----|----|----|----|
| EP | 1820626 A1 | 4/2017 | |
| FR | 17/01245 | 5/2019 | |
| FR | 17/01247 | 5/2019 | |
| FR | 3074082 A1 | 5/2019 | |
| FR | 3074084 A1 | 5/2019 | |
| WO | WO 2008/132299 A2 | 11/2008 | |
| WO | WO 2014/029969 A1 | 2/2014 | |
| WO | WO 2017/072418 A1 | 5/2017 | |
| WO | WO 2017/072421 | 5/2017 | |
| WO | WO-2017072418 A1 * | 5/2017 | ........... B29C 70/384 |
| WO | WO 2017/134453 | 8/2017 | |

OTHER PUBLICATIONS

Application and File history for U.S. Appl. No. 17/050,777, filed Oct. 26, 2020. Inventors: Gaillard et al.

English Translation of International Search Report PCT/FR2019/000060, dated Jul. 17, 2019, 2 pages.

International Search Report PCT/FR2019/000060, dated Jul. 17, 2019, 4 pages.

International Search Report for PCT/FR2019/000060, dated Jul. 17, 2019, 4 pages.

English translation of International Search Report for PCT/FR2019/000060, dated Jul. 17, 2019, 2 pages.

\* cited by examiner

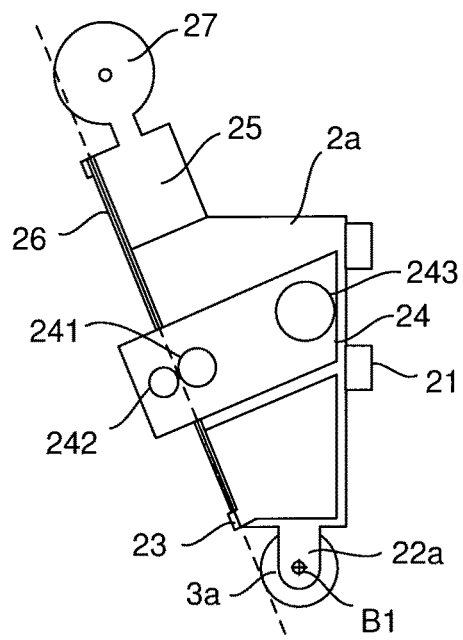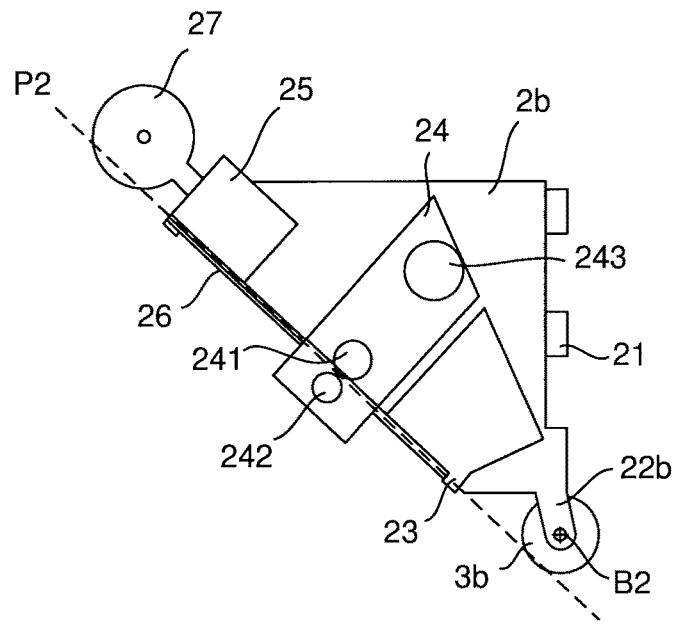
FIG. 9
FIG. 10
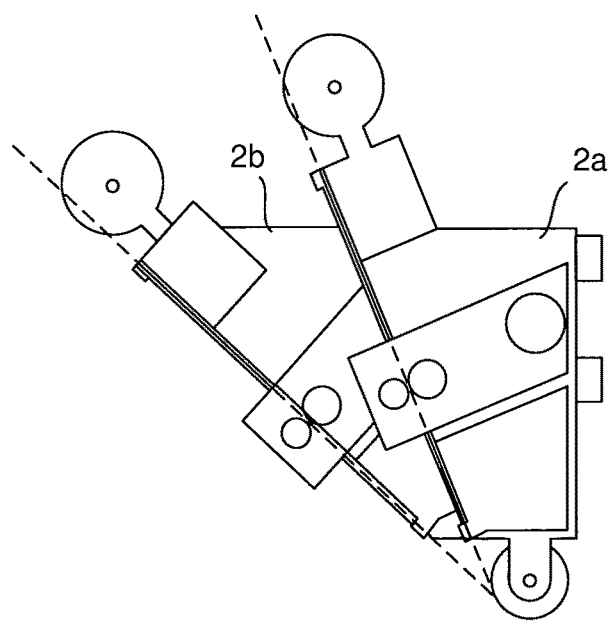
FIG. 11

FIBER APPLICATION HEAD COMPRISING HEATING MEANS ASSOCIATED WITH FUNCTIONAL MODULES

RELATED CASES

The present application is a National Phase entry of PCT Application No. PCT/FR2019/000060, filed Apr. 23, 2019 which claims priority from FR Patent Application No. 18/00446, filed Apr. 25, 2018, which applications are hereby incorporated by reference in their entireties.

TECHNICAL FIELD

The present invention relates to a fiber application head for the production of composite material parts, and more particularly a fiber application head comprising particular heating means associated with functional modules. The present invention also relates to a method for the manufacture of composite material parts by means of a corresponding application head.

BACKGROUND ART

Fiber application machines are known for the application by contact on a lay-up tool, such as a male or female mold, of a wide band formed of one or more tow type continuous flat fibers, dry or impregnated with thermosetting or thermoplastic resin, in particular carbon fibers, consisting of a multitude of carbon threads or filaments.

These fiber application machines, also called fiber placement machines, typically include an application head, a displacement system able to displace the application head, and storage means to store the fibers. The fiber storage means can be mounted on the head, or can be located at a distance from the head. The head conventionally comprises a compaction system including at least one application roller for the application of a band formed of several fibers arranged edge to edge onto an application surface of a lay-up tool, a guiding system for guiding the fibers in the form of a band towards the application roller, and for each fiber, cutting means for cutting a fiber, rerouting means for rerouting the fiber to the application roller after a cut performed by the cutting means, and clamping means for clamping the fiber that has just been cut.

The compaction system further includes at least one compaction cylinder for applying the fiber with a compaction force.

In order to be able to apply wide fiber bands, especially on concave or convex application surfaces, it has been proposed notably in the patent document EP2594389, to use a compaction system comprising independent compaction rollers. Each roller is used to apply a single fiber, and is supported by a fastening system comprising a motor-driven height displacement system and a compaction cylinder to compensate for irregularities in the application surface. Such a compaction system, as well as the cutting means and the rerouting means for each fiber can be difficult to control, especially to achieve lay-up accuracies in the case of cutting and rerouting fibers on the fly.

The rollers are arranged in staggered rows in two parallel rows to be able to apply fiber bands in which the fibers are tangent to each other laterally. Such positioning of the rollers in two rows simplifies the architecture of the head, and in particular the mounting of the different rollers on the head.

In the case of lay-up of fibers pre-impregnated with a thermosetting polymer, it can be envisaged to provide the head with heating means arranged upstream of the compaction rollers, for example in the form of ramps of infrared lamps, to heat the application surface or the fibers previously laid-up and thus ensure the adhesion of the various plies to each other during lay-up.

For certain types of fibers, such as dry fibers provided with a binder, or fibers pre-impregnated with a thermoplastic polymer, it is necessary to heat the lay-up surface, as well as the fibers to be laid-up, preferably at the contact area between the roller and the surface. The head proposed in the cited patent document makes difficult, even impossible the lay-up of such fibers.

The purpose of the present invention is to propose a solution to overcome at least one of the above-mentioned drawbacks.

SUMMARY

For this purpose, the embodiments of the present invention proposes a fiber application head for the production of composite material parts by application of bands formed of several continuous fibers arranged side by side, preferably edge to edge, comprising a compaction system comprising several independent compaction rollers and compaction cylinders for applying the fibers with a compaction force and, for each fiber, cutting means and rerouting means, and preferably clamping means, characterized in that for each fiber, the head comprises a functional module including the cutting means and the rerouting means, each functional module is mounted so as to be movable in translation along a compaction direction on a support element of the head, each compaction roller is mounted on one or more adjacent functional modules;

a compaction cylinder is associated with the functional module(s) associated with a compaction roller for the displacement in translation of the functional module(s), the head further comprising heating means, arranged upstream of the compaction rollers with respect to the advancement direction of the head during lay-up, comprising an independent heating system associated with each compaction roller, the heating system being able to displace with the functional module(s) associated with the one compaction roller, when the functional module(s) displace along the compaction direction.

According to embodiments of the invention, a heating system is associated with each compaction roller and displaces in the compaction direction with the associated functional module(s), ensuring optimum heating during lay-up. The heating system is adjusted so that it is able to emit heat radiation towards the lay-up surface and/or one or more previously applied fibers, preferably in the direction of the nip or contact area between the compaction roller and the application surface, in order to heat the fiber located on the roller, before its compaction by the latter, as well as the application surface and/or one or more previously applied fibers. When the functional module is displaced in the compaction direction, the distance between the heating system and the application surface, the distance between the heating system and the compaction roller, and the orientation of the radiation with respect to the application surface and the compaction roller vary slightly, preferably remain substantially constant.

According to an embodiment, characterized in that the heating system is able to emit a thermal radiation towards the nip or contact area between the compaction roller and the application surface, in order to heat each fiber located on the compaction roller, prior to its compaction by the latter, as well as the application surface and/or one or more previously applied fibers.

According to an embodiment, each heating system includes one or more hot air torches, a laser type heating system, or a flash lamp type heating system.

According to an embodiment, the heating system is mounted directly on the module(s) associated with a same compaction roller.

According to another embodiment, each heating system is mounted so as to be movable in translation in the compaction direction on the support element, upstream of the functional module(s) associated with a same compaction roller, and is mechanically connected by at least one rigid arm to the functional module(s). In this embodiment mode, the displacement of the heating system is ensured by the compaction cylinder via the connecting arm. In one embodiment variant, the heating system is displaced by its own actuating system, for example a cylinder, which operates in synchronism with the compaction cylinder.

In another embodiment, each heating system is pivotably mounted on the support element, upstream of the functional module(s) associated with a same compaction roller, about an axis parallel to the rotation axis of the compaction rollers and is mechanically connected by at least one connecting rod to the functional module(s), the connecting rod being pivotably mounted by its ends to the heating system and to the functional module(s).

According to an embodiment the head includes one compaction roller per functional module.

According to an embodiment, the head comprises at least one first functional module, also called downstream functional module, and at least one second functional module, also called upstream functional module, arranged alternately side by side, each first functional module comprising guiding means able to guide a first fiber towards a compaction roller along a first guiding plane, and each second functional module comprising guiding means able to guide a second fibre towards a compaction roller along a second guiding plane, different from the first guiding plane, so as to form at the compaction rollers a fiber band formed of first and second fiber(s) arranged alternately edge to edge.

The use of first and second functional module(s) guiding the fibers along a first guide plane and a second guide plane makes it possible to lay up fiber bands in which the fibers are arranged edge to edge, the fibers being substantially adjoined by their longitudinal edges.

The head can comprise only one first functional module and only one second functional module, the head then being able to lay up a fiber band formed of a first fiber and a second fiber arranged edge to edge. When the head comprises several first functional modules and second functional modules, the first functional modules and second functional modules are arranged alternately side by side, the head being able to lay up a fiber band formed of first fibers and second fibers arranged alternately edge to edge According to an embodiment, the compaction rollers are arranged in a single row, side by side, preferably without contact with each other, the rotation axis of the compaction rollers being arranged in the same plane, called the compaction plane, parallel to the compaction direction, This single-row arrangement allows the use of simple and efficient heating means that can heat up at the contact line between the application surface and each compaction roller. Surprisingly, the inventors found that partial compaction of the fibers or of certain fibers over only part of their width resulted in a satisfactory lay-up quality, and that it is therefore possible to use, in the case of a head comprising one compaction roller per fiber, a compaction roller with a width smaller than the width of the fiber. The compaction cylinders are able to displace the functional modules between a first extreme position, called high position, and a second extreme position, called low position. The rotation axis of the rollers in the extreme high position or in the extreme low position are substantially aligned.

The compaction rollers are aligned while being spaced apart from each other, so that they can displace in the compaction plane independently of each other.

The head according to an embodiment of the invention comprises at least two compaction rollers, each compaction roller being associated with one functional module or two functional modules.

According to an embodiment, each compaction roller is mounted on one or more functional modules between two flanges, preferably with a clearance between the flanges of two adjacent compaction rollers. In another embodiment, each compaction roller comprises two compaction rolls, rotatably mounted in cantilevered manner on either side of the same flange or support.

According to an embodiment, each first functional module comprising guiding means able to guide a first fiber towards the compaction roller associated with the first functional module along a first guiding plane forming a first non-zero angle with the compaction plane of the rotation axis of the compaction rollers, each second functional module comprising guiding means able to guide a second fiber towards the compaction roller associated with the second functional module along a second guiding plane forming a second non-zero angle with the compaction plane of the rotation axis of the compaction rollers, the second angle being greater than the first angle, the guiding planes being arranged on the same side of the compaction plane.

This particular head architecture with two guide planes arranged on the same side with respect to the compaction plane ensures optimal guidance of the fibers as close as possible to the compaction rollers, and an angle of arrival of the fibers on the compaction rollers allowing an optimal heating of the fibers by heating means arranged upstream of the compaction rollers.

According to an embodiment, each support element is mounted so as to be movable in translation on a frame of the head in a direction perpendicular to the compaction direction, so that each support element can be displaced from a lay-up position, in which the functional modules are side by side and in which the head is able to lay up a fiber band formed of fibers arranged edge to edge, to a maintenance position in which the functional module(s) carried by the support element is (are) spaced apart from the other support elements and accessible for carrying out maintenance operations. This mounting of the functional modules on support elements which are movable in translation on a frame allows simple access to the functional modules for maintenance operations, in particular maintenance operations on the cutting means and/or the rerouting means, as well as the positioning of the fiber in each functional module.

According to an embodiment, each support element carries two adjacent modules, each functional module being preferably accessible from a lateral face of the support element.

According to an embodiment, at least one support element can be displaced by a drive motor, the support element being for example equipped with a motor cooperating with a gear rack attached to the frame, the support elements being equipped with assembly means for assembling and disassembling two by two adjacent support elements. Preferably, each outer support element is able to be displaced by a drive motor.

According to an embodiment, each support element is able to carry a fiber spool or fiber reel associated with each functional module carried by the support element. According to an embodiment, the support element comprises a mandrel for receiving each fiber spool or reel, the axial locking of spools or reels on their respective mandrels being carried out by an adjacent support element when the support elements are in the lay-up position.

According to an embodiment, the application head comprises limiting means, preferably mechanical, able to limit the relative strokes of two adjacent functional modules in the compaction direction, so as to allow an arrangement of the cutting means of the functional modules and a guiding of the fibers as close as possible to the compaction rollers, and thus guarantee a good lay-up quality, while avoiding collisions, in particular between the cutting means. The limiting means comprise, for example, for each pair of adjacent modules associated with different compaction rollers, a finger attached to one of the two functional modules and positioned between two stops of the other functional module, the two stops being spaced apart in the compaction direction.

The present invention also relates to a method for the manufacture of a composite material part comprising the application of continuous fibers on an application surface, characterized in that the application of fibers is carried out by means of a fiber application head as described above, by relative displacement of the application head with respect to the lay-up surface along lay-up trajectories.

BRIEF DESCRIPTION OF THE DRAWINGS

The invention will be better understood, and other purposes, details, characteristics and advantages will appear more clearly in the following detailed explanatory description of a particular currently preferred embodiment of the invention, with reference to the attached schematic drawings, on which:

FIGS. 9 and 10 are enlarged side views of the downstream and upstream functional modules respectively, schematically illustrating the cutting means, rerouting means and clamping means of the functional modules;

FIG. 11 is a view illustrating the relative position of the functional modules in FIGS. 9 and 10;

DETAILED DESCRIPTION

Figure 1:
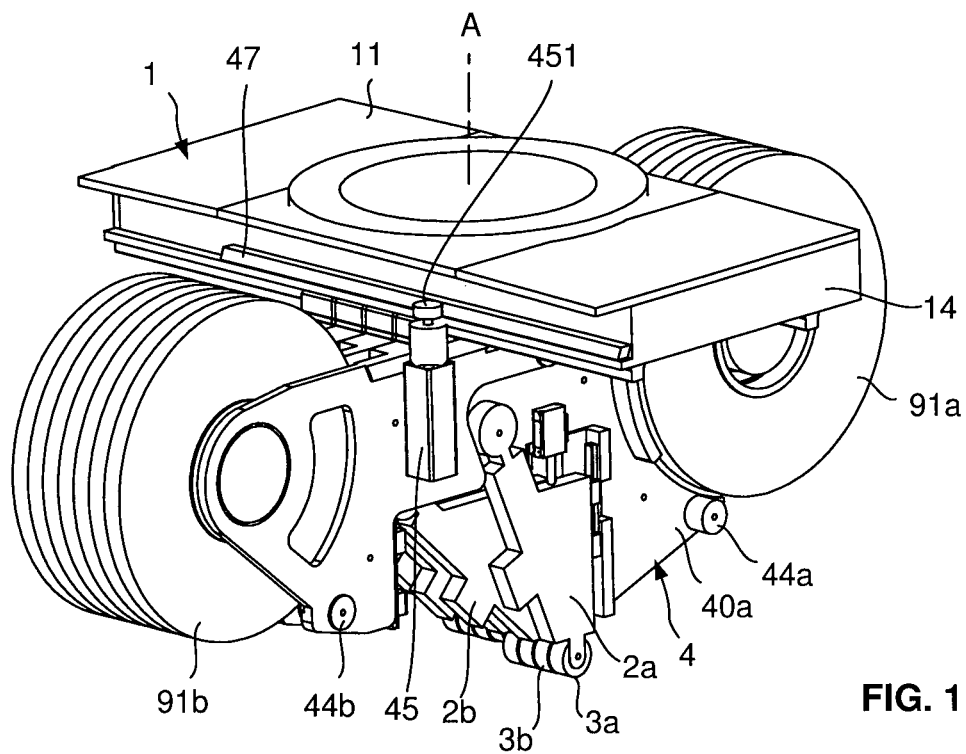
FIGS. 1 and 2 are two schematic views in perspective of a fiber application head according to an embodiment of the invention.
Figure 2:
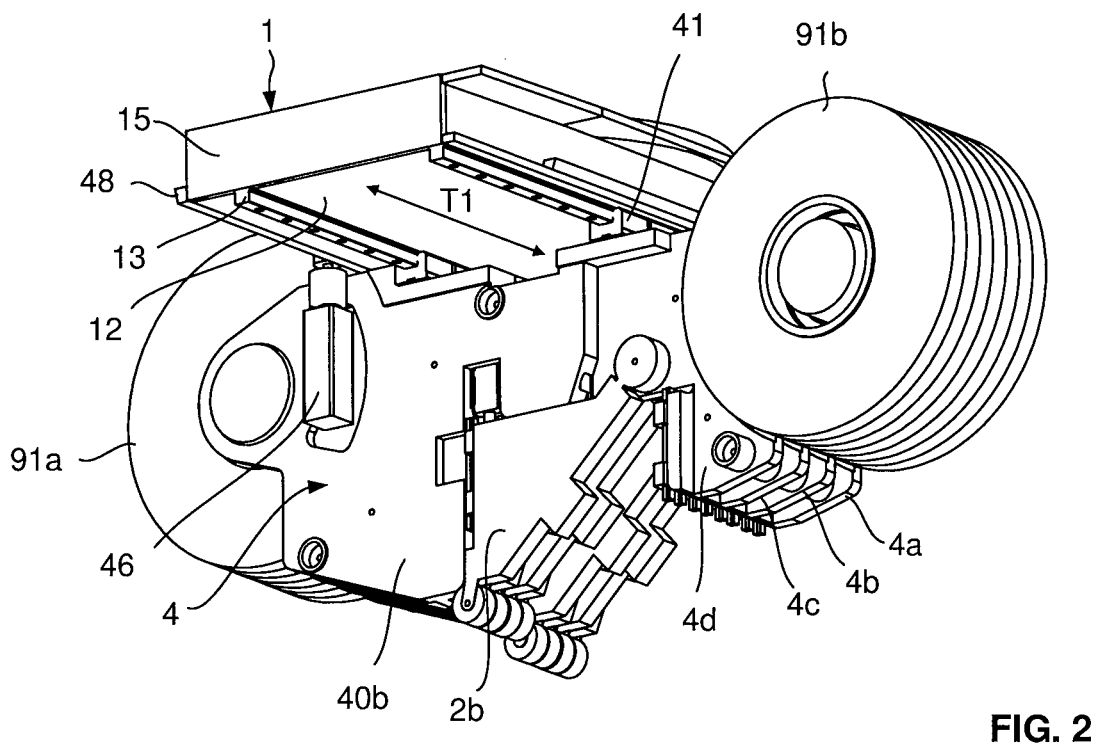
Figure 3:
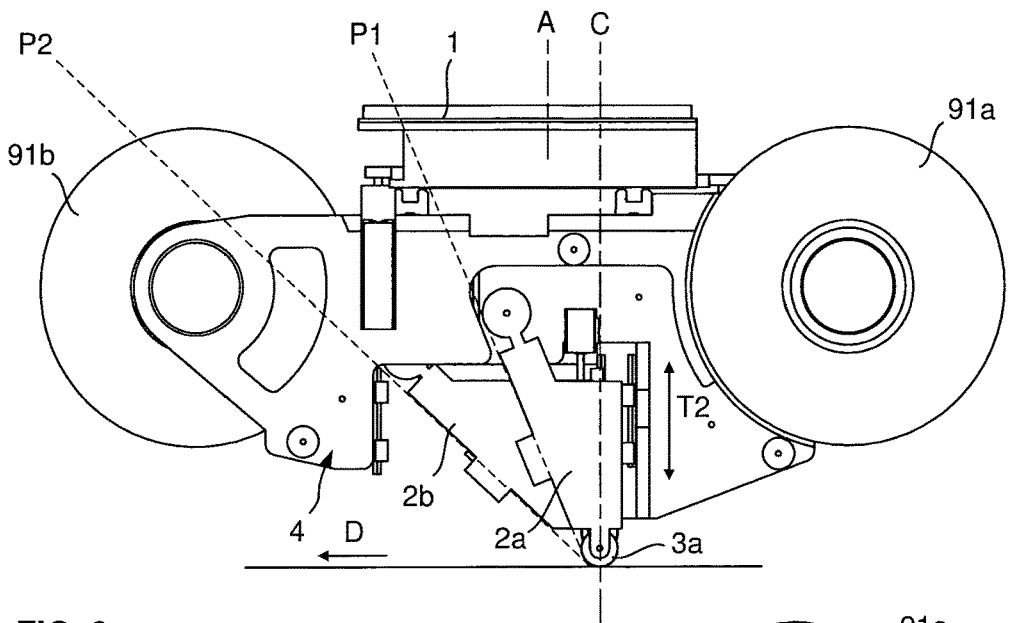
FIG. 3 is a side view of the head of FIG. 1.

FIGS. 1 to 3 illustrate a fiber application head according to an embodiment of the invention for the lay-up of a band formed of several continuous fibers.

The head according to an embodiment of the invention is intended to be assembled to a displacement system for carrying out the fiber lay-up operations, the fibers being in the present embodiment packaged in the form of reels, and the reels are embedded on the head.

The head comprises a support structure or frame 1 having an upper main face 11 provided with assembly means (not shown) for assembling the head according to an assembly axis A, to a head displacement system, for example the wrist of a polyarticulated robot or a gantry-type Cartesian displacement system.

The head carries a plurality of functional modules 2a, 2b arranged side by side. Each functional module is associated with a fiber reel 91a, 91b and includes cutting means, rerouting means and clamping means. Each module carries a compaction roller 3a, 3b.

The head comprises two types of functional modules, first functional modules 2a, also called upstream functional modules, associated with upstream fiber reels 91a, arranged upstream of the functional modules with respect to the advancement direction D (FIG. 3) of the head during lay-up, and second functional modules 2b, also called downstream functional modules, associated with downstream fiber reels 91b, arranged downstream of the functional modules with respect to the advancement direction D. The functional modules are arranged in a row, the row comprising an alternating sequence of upstream functional modules 2a and downstream functional modules 2b.

The mounting of the functional modules on the frame is carried out by means of support elements 4, each support element, formed of one or more parts, carrying a downstream functional module 2a and an upstream functional module 2b.

In the present embodiment, the head is intended for the lay-up of a band of eight fibers, the head comprises four identical support elements 4, each carrying two functional modules, the support elements being individually referenced under the references 4a, 4b, 4c and 4d in the figures.

Each support element 4 is mounted on the lower main face 12 of frame 1 so as to be movable in translation, in a direction T1, perpendicular to the assembly axis A. For this mounting in translation, each support element 4 is equipped on an upper edge with two carriages 41 for mounting the support element on two corresponding rails 13, mounted on the bottom face 12 of the frame, extending from a first end 14 to a second end 15 of the frame.

Figure 4:
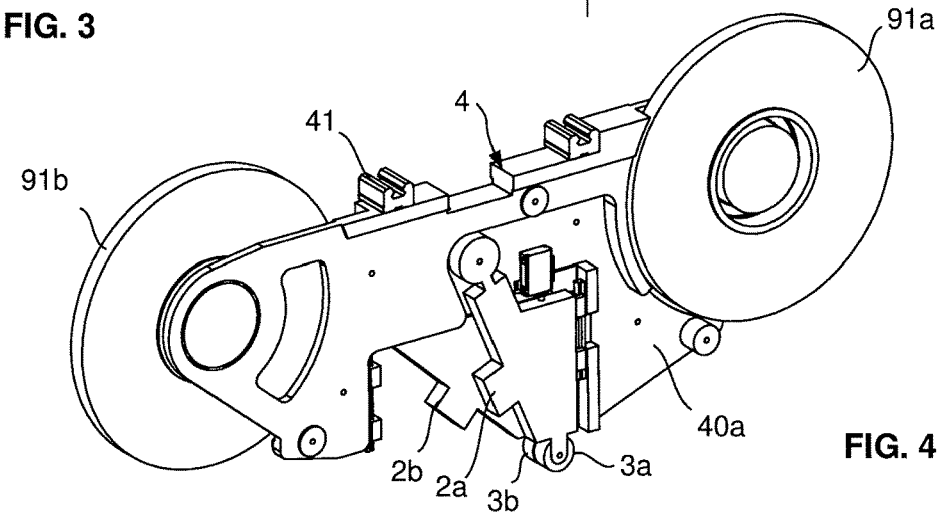
FIG. 4 is a schematic perspective view of a support element of the head of FIG. 1, the support element carrying two functional modules and the associated fiber reels.
Figure 5:
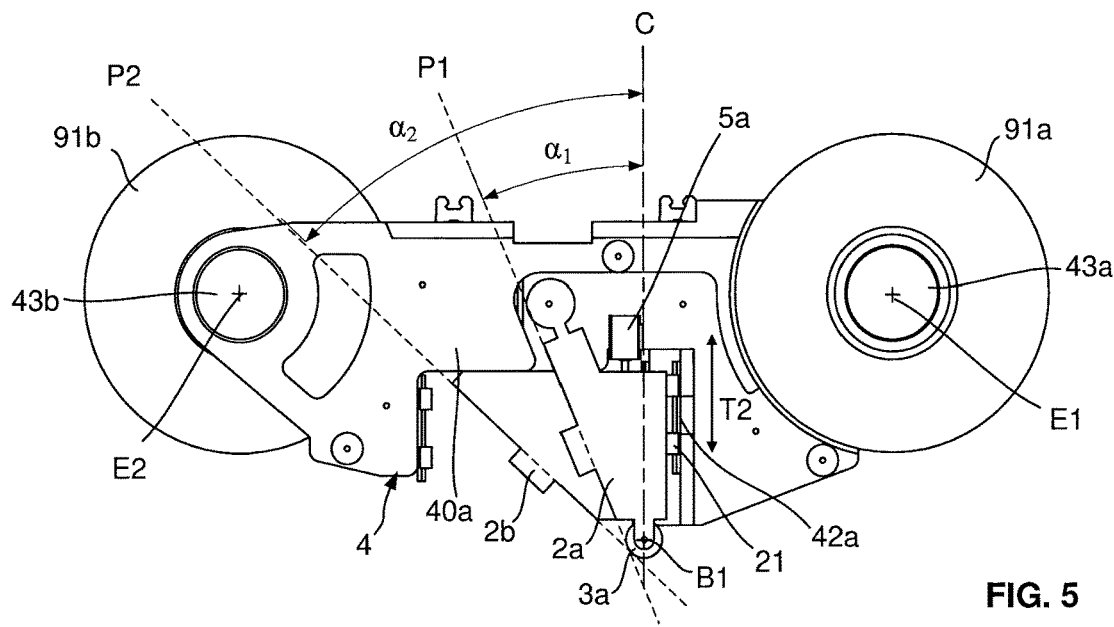
FIGS. 5 and 6 are side views of the support element of FIG. 4, illustrating respectively a downstream functional module and an upstream functional module, the functional modules being in the extreme high position.
Figure 6:
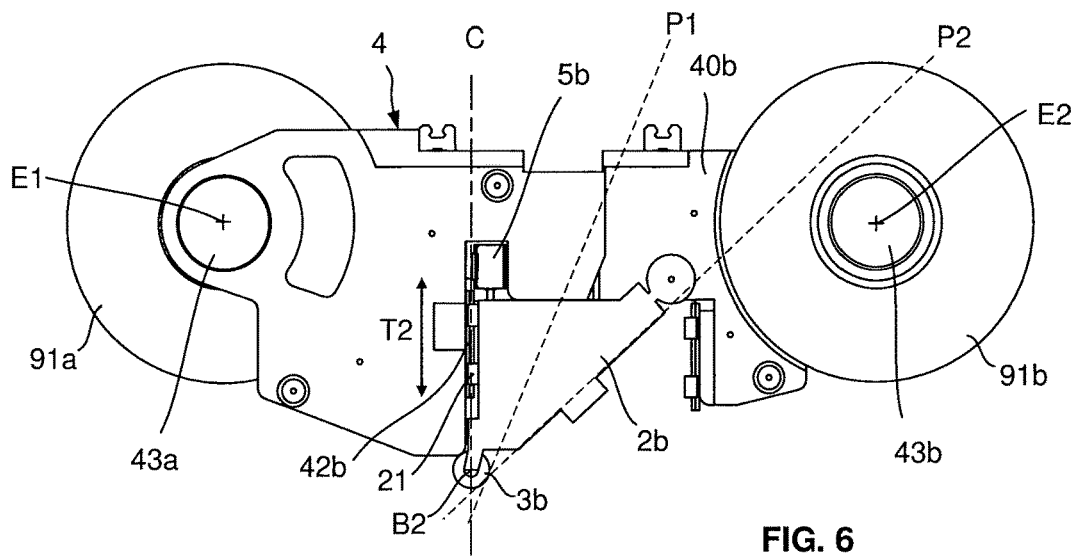

Referring to FIGS. 4 to 6, the support element 4 carries a downstream functional module 2a, accessible from a first lateral face 40a of the support element, and an upstream functional module 2b, accessible from a second lateral face 40b.

The downstream functional module 2a is mounted on the support element, movable in translation in a direction T2, which is parallel to the assembly axis A. For this mounting, the downstream functional module is equipped with carriages 21 mounted sliding on a rail 42a, which is attached to the support element. The module is assembled at its upper part to the end of the rod of a compaction cylinder 5a, the cylinder being assembled by its body to the support element. The downstream functional module carries a compaction roller 3a at its bottom part. The compaction roller is mounted between two flanges 22a of the downstream functional module, movable in rotation about a rotation axis B1, which is perpendicular to the direction T2. During the displacement of the functional module in translation in the T2 direction, the rotation axis B1 of the compaction roller displaces in a plane C, called compaction plane, which is parallel to the direction T2. The downstream functional module includes fiber guiding means for guiding the fiber entering the module towards the compaction roller along a plane P1, the plane forming an angle $\alpha_1$ with the plane C.

Referring to FIG. 9, the downstream functional module includes cutting means 23 for cutting the fiber, rerouting means 24, for rerouting the fiber to the compaction roller after a cutting operation, and clamping means for clamping the fiber just cut.

The cutting means, known per se, comprise at least one blade able to be maneuvered by a cutting cylinder between a rest position and an active position to cut a fiber. The clamping means, known per se, include for example a clamping block able to be maneuvered by a clamping cylinder between a rest position and an active position to clamp the fiber. As an example, the downstream functional module includes cutting means and clamping means, as described in patent document EP2134532, WO2017/072421 or FR17/01245 and FR17/01247.

The rerouting means comprise a motorized drive roller 241 and a counter-roller 242 actuated by a rerouting cylinder between a rest position and an active position. The drive roller 241 is driven in rotation by a motor 243 embedded in the downstream functional module, for example by means of a belt or gear system. In active position, the counter-roller is able to press the fiber against the drive roller for re-routing the fiber.

The guiding means 26 allow to guide the fiber between the clamping means, the rerouting means and the cutting means, and towards the compaction roller, and include for example a channel formed at the assembly interface of two plates. The fiber unwound from the reel 91a associated with the module is guided at the entrance of the guiding means 26 by a pulley 27 which is rotatably mounted between two flanges attached to the functional module. The support element also carries on its first lateral face a mandrel 43a, motorized or not, to receive the reel, so that the reel is mobile in rotation about a rotation axis E1. The fiber unwound from the reel is routed to pulley 27 of the module by means of a set of pulleys (not shown), rotatably mounted on the lateral face 40a. A tension control system can also be provided in the fiber path between the reel and pulley 27 to take up the slack and/or control the rotation of the mandrel.

Figure 8:
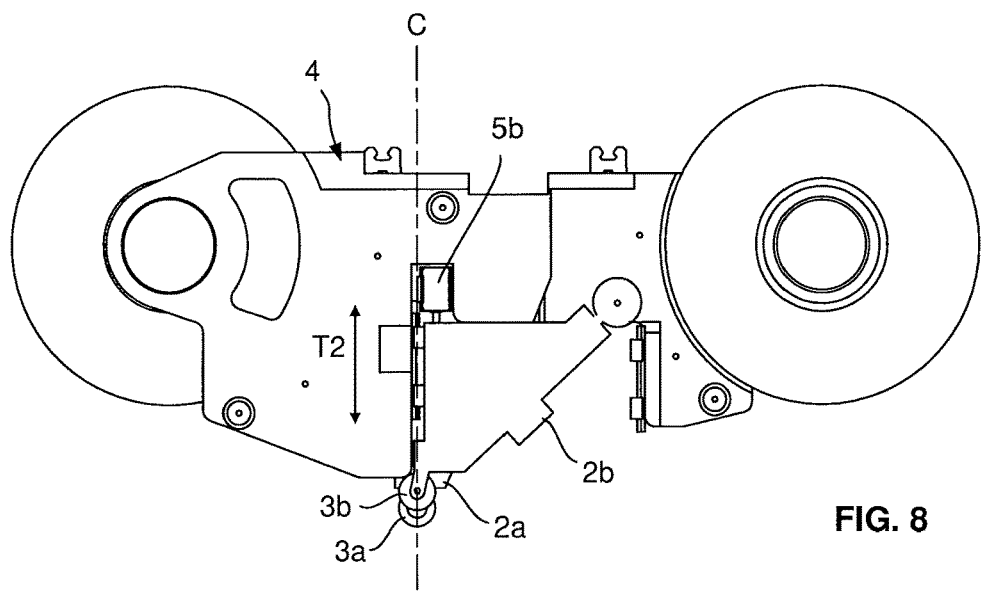

Similarly, with reference to FIGS. 6, 8 and 10, the upstream functional module 2b is mounted so as to be movable in translation in direction T2, the upstream functional module being equipped with carriages 21 mounted sliding on a rail 42b attached to the support element. The module is assembled at its upper part to the end of the rod of a compaction cylinder 5b, the cylinder being assembled by its body to the support element. The upstream functional module carries at its bottom part a compaction roller 3b. The compaction roller 3b is mounted between two flanges 22b of the downstream functional module, movable in rotation about a rotation axis B2, which is perpendicular to the direction T2. During the displacement of the module in translation in direction T2, the rotation axis B2 of the compaction roller 3b of this module displaces in the same plane C as the rotation axis B1 of the compaction roller 3a of the downstream functional module.

The downstream functional module comprises fiber guiding means 26 for guiding the fiber entering the module towards the compaction roller along a plane P2, the planes P1 and P2 being arranged on the same side of plane C, the plane P2 forming an angle $\alpha_2$ with plane C which is greater than the angle $\alpha_1$, plane P1 being arranged upstream a plane P2 with respect to the advancement direction of the head during lay-up. The downstream functional module includes cutting means 23, rerouting means 24, and clamping means, the means being identical to those of the downstream functional module.

The upstream functional module has a shape that is different from the one of the downstream functional module, so that the guiding plane P2 is offset from the guiding plane P1. As shown in FIG. 11, the guiding means, cutting means, rerouting means and clamping means of the upstream functional module are offset in relation to those of the downstream functional module. In order to limit the cantilever, the rail 42b on which the upstream functional module is mounted is offset in relation to the rail 42a on which the downstream functional module is mounted. The upstream functional module also carries a pulley 27 rotatably mounted between two flanges, to guide the fiber unwound from reel 91b at the entrance of the functional module.

The support element also carries on its first lateral face 40a a mandrel 43b, motorized or not, to receive the reel 90b, so that the reel is mobile in rotation about a rotation axis E2, as well as, as previously, a set of guiding pulleys and a possible tension control system.

The four support elements are mounted on the frame so that the rotation axis of the rollers are all arranged substantially in the same plane C.

The compaction rollers are all identical and are preferably able to conform to the application surface, especially to convex and/or concave application surfaces. Each compaction roller is preferably a compaction roller made of a so-called flexible material, which is elastically deformable, such as an elastomer. The roller comprises a cylinder made of flexible material, which is mounted fixed in rotation on a rigid axis, e.g. made of metal, by which the roller is mounted free to rotate between two flanges.

Figure 7:
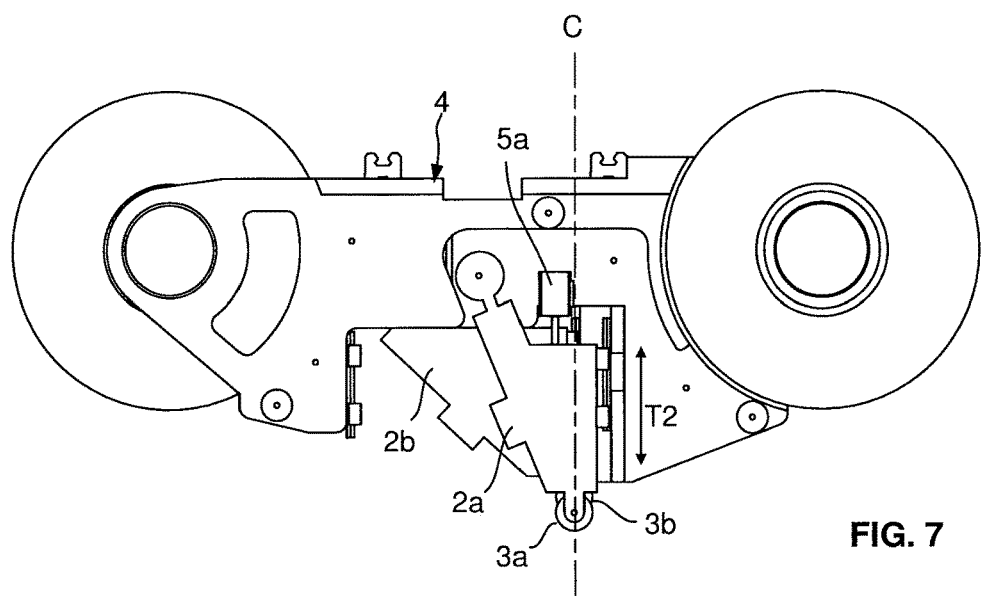
FIGS. 7 and 8 are views similar to FIGS. 5 and 6, with the downstream functional module in low position and the upstream functional module in high position.

Each compaction cylinder 5a, 5b is able to displace its associated functional module between an extreme high position and an extreme low position. In FIG. 4, both modules are in extreme high position. In FIGS. 7 and 8, the downstream functional module is in extreme low position while the upstream functional module is in extreme high position.

For example, each compaction cylinder is a double-acting cylinder, preferably pneumatic, with two chambers supplied with compressed air, a first lower chamber between the piston and the functional module and a second upper chamber on the opposite side of the piston.

For the lay-up of a fiber with a functional module, the module is elastically urged to its extreme low position by its compaction cylinder. The head is brought into contact with the lay-up surface, with the roller in contact with the lay-up surface. The compaction force for the lay-up can be regulated by adapting the compressed air supply pressure in the upper chamber of the cylinder. During lay-up, the functional module can displace between its extreme low position and its extreme high position to conform to the lay-up surface.

When the module is not used to lay up a fiber, it is held in extreme high position by supplying compressed air to the lower chamber.

As an example, in FIGS. 1 to 3, the four functional modules of the two support elements 4a and 4b are in extreme low position for the lay-up of a four-fiber band, while the other four functional modules of the other two support elements 4c and 4d are held in extreme high position. During lay-up, the functional modules of the support elements are able to displace between their extreme high and extreme low positions independently of each other, depending on variations in geometry of the application surface.

The guiding means, as well as the cutting means, at least at the blade(s) of the cutting system, necessarily have a transverse dimension greater than the fiber width. To enable the lay-up of fiber bands in which the fibers are substantially edge to edge, the guiding means and the cutting means of the upstream functional modules and those of the downstream functional modules are arranged in such a way as to allow the displacement of the functional modules independently of each other between their extreme low position and their extreme high position. In the case of a head intended for the lay-up of bands of edge-to-edge fiber, the head comprises compaction rollers with a width smaller than that of the fibers, the difference in width corresponding to the space required for the mounting in rotation of the compaction rollers between two flanges. The spacing between the lateral faces of two adjacent compaction rollers basically corresponds to the thicknesses of the two adjacent flanges plus an inter-flange clearance.

Figure 12:
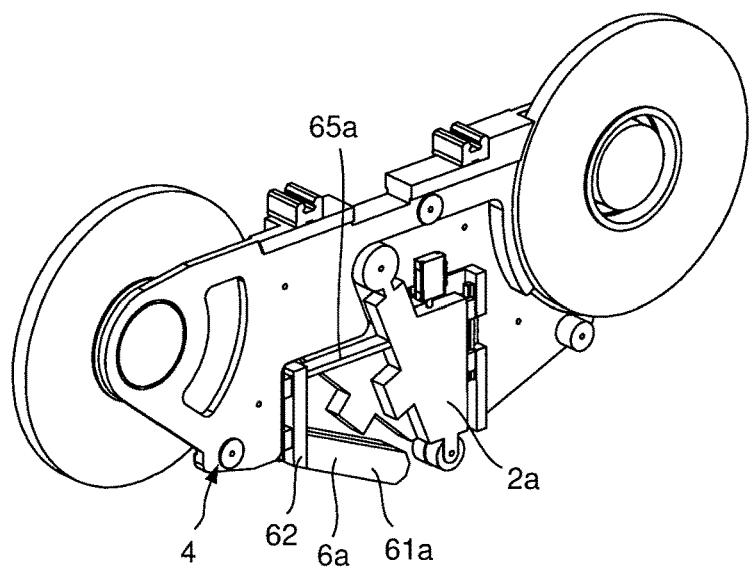
FIGS. 12, 13 and 14 are views similar to those in FIGS. 4, 5 and 7, respectively, on which heating systems of the head have been added.
Figure 13:
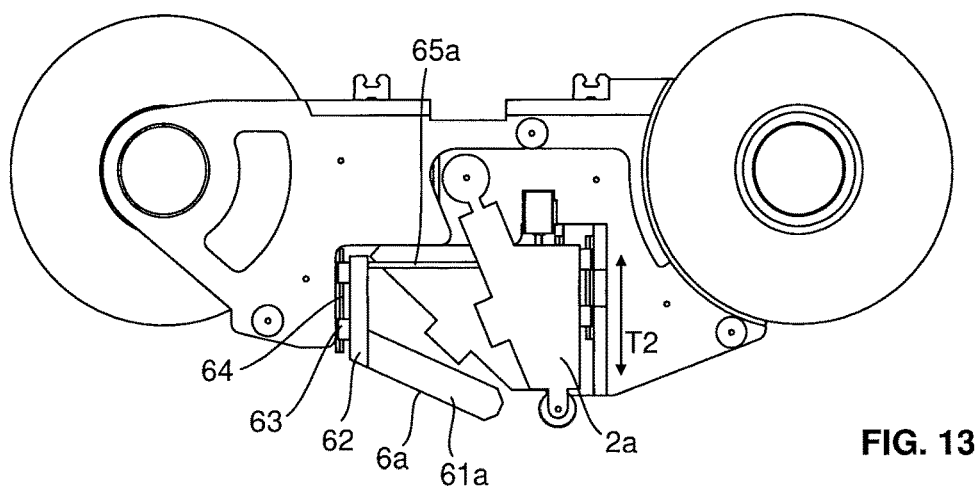
Figure 14:
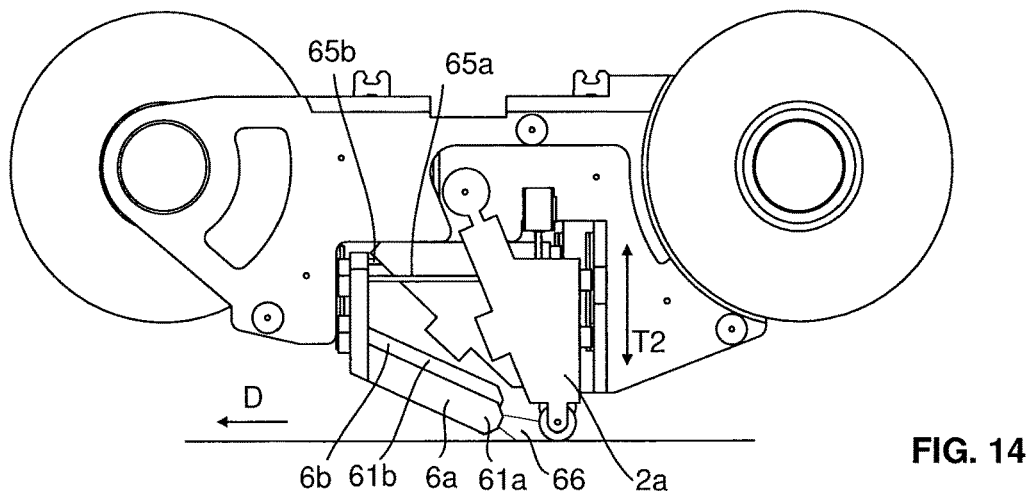

The head includes a heating system associated with each functional module to heat at least the application surface upstream of the compaction roller, preferably the application surface upstream of the roller, as well as the fiber to be laid up at the outlet of the guiding means. For the sake of clarity of the figures, the heating systems are shown only in FIGS. 12 to 14. Each support element 4 carries a heating system 6a associated with the downstream functional module 2a and a heating system 6b associated with the upstream functional module 2b. The heating systems are mounted on the support element upstream of the functional modules in relation to the advancement direction of the head.

In the present embodiment, each heating system comprises a hot air torch 61a, 61b, preferably electric, of compressed air type or associated with a turbine, able to emit a flow of hot air. Each torch is mounted on a support 62 mounted so as to be mobile in translation in direction T2, via carriages 63 attached to the support sliding on a rail 64 attached to the support element. The heating system 6a is connected to the downstream functional module by a connecting arm 65a, so that the hot air torch displaces in translation with the downstream functional module during lay-up. Similarly, the heating system 6b is connected to the upstream functional module 2b by a connecting arm 65b.

The mounting of the hot air torch is carried out in such a way that the hot air flow 66 is directed towards the nip area between the roller and the application surface. The connection of the hot air torch to its functional module guarantees optimal heating for the lay-up of the fiber.

The mounting of the heating systems on rails allows the cantilever of the functional modules to be limited. However, according to an embodiment, each heating system is mounted directly on a functional module.

In an embodiment variant, the heating system comprises two air torches for each functional module, for example, one above the other.

The heating system can furthermore include one or more infrared lamps mounted on the support element upstream of the torch(s) to heat the lay-up surface.

In other embodiments, the above-mentioned air torch heating system is replaced with a laser type heating system or a flash lamp type heating system, as described in patent document WO2014/029969 or WO2017/134453. In the case of a laser or flash lamp type heating system, the radiation is directed obliquely towards the nip area or contact area between the application roller and the application surface, in order to heat the fiber located on the roller, before its compaction by the latter, as well as the application surface and/or one or more previously applied fibers.

The fibers are preferably tow-type continuous flat fibers preimpregnated with a thermosetting resin or a thermoplastic resin, or dry fibers provided with a binder. The binder is in the form of powder and/or one or more veils, preferably of the thermoplastic type.

The head according to an embodiment of the invention is particularly advantageous for lay-up of dry fibers provided with a binder or fibers preimpregnated with thermoplastic resin.

The head can be adapted for the lay-up of fibers of different widths, but is particularly advantageous for the lay-up of fibers of at least half an inch in width, for example one inch, one and a half inch, or two inches. For a width of up to half an inch, the fibers can be wound into traverse winding spools with helical turns. Beyond half an inch in width, the fiber is wound into spools or reels without traverse winding.

With reference to FIGS. 1 and 2, the support elements are arranged side by side in a lay-up position, in which the head is able to lay up a fiber band consisting of fibers arranged edge to edge, and in which the support elements are centered with respect to the axis A. The support elements are equipped with assembly or locking means 44a, 44b, for example pneumatic means, enabling two adjacent elements to be assembled and disassembled. The two outer support elements 4a and 4d are each equipped with a motor 45, 46 whose shaft is equipped with a pinion 451 meshing with a gear rack 47, 48 mounted on the support element to allow the displacement of the functional modules 4a, 4b in translation in the direction T1.

In the lay-up position of the support elements shown in FIGS. 1 and 2, the support elements are assembled to each other. The holding in the lay-up position is ensured by the motors 45, 46. As an alternative, locking means for locking in translation.

FIGS. 15 to 18 show the different positions of the support elements for carrying out maintenance operations on the upstream and downstream functional modules of the support elements, as well as for loading new fiber reels.

In the lay-up position, the first main face 40a of the outer support element 4a located on the side of the first end 14 is accessible, for example to access its upstream functional module to carry out maintenance operations on its cutting means, rerouting means and/or clamping means, on its compaction roller, to carry out a fiber reel change, and to carry out the passage of fiber from the reel to the compaction roller. The second main face 40b of the external support element 4d is also accessible to access its upstream functional module and its associated reel to carry out the above-mentioned operations.

Figure 15:
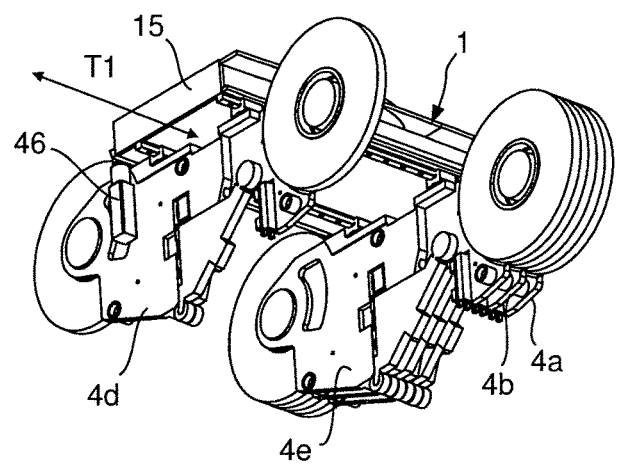
FIGS. 15 and 16 are respectively perspective and side views of the head in FIG. 1, with the support elements in a maintenance position.
Figure 16:
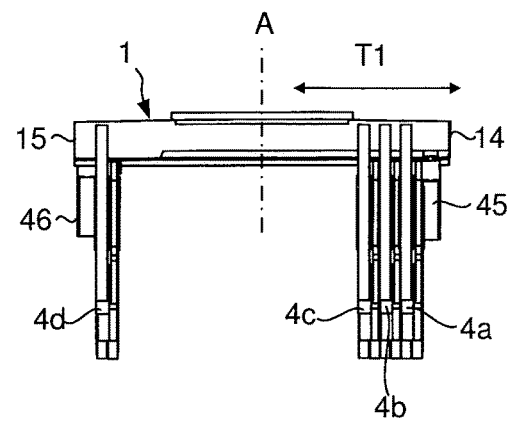

Starting from this lay-up position, the outer support element 4d is disassembled from the adjacent support element 4c, by controlling their locking means 44a, 44b, and its motor 46 is controlled to displace it towards the second end 15, as shown in FIGS. 15 and 16. The motor 45 of the outer support element 4a is controlled to displace it towards the first end 14, with the support element 4e assembled to the support element 4b, itself assembled to the motorized outer support element 4a.

In this maintenance position, the outer support element 4d is displaced away from the support element 4c, so that an operator can access the main faces facing these support elements and carry out maintenance operations on the functional modules and reels that are accessible from these faces.

Figure 17:
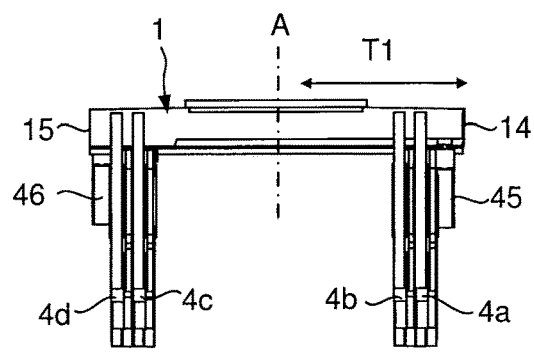
FIGS. 17 and 18 are similar views to FIG. 16 illustrating other maintenance positions of the support elements; and, FIG. 19 is a side view of a head according to an embodiment variant.

From this maintenance position in FIGS. 15 and 16, the motors 45, 46 can be controlled to bring the support elements back to the lay-up position of FIG. 1, then after assembly of support element 4c to support element 4d, and disassembly of support element 4c from support element 4b, the motors are controlled to bring the outer support elements back to the ends 14, 15 as shown in FIG. 17. In this maintenance position, an operator can carry out maintenance operations on the functional modules and associated reels accessible from the main faces facing the central functional elements 4c and 4b.

Figure 18:
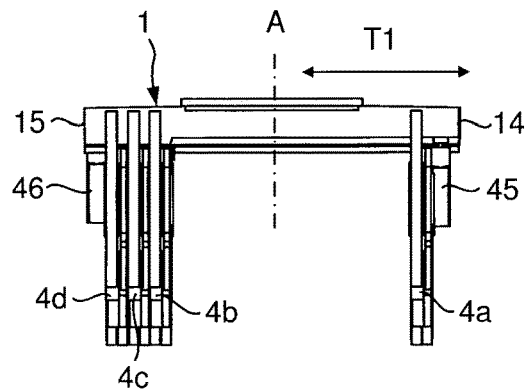

The motors 45, 46 can then be controlled to bring the support elements back to the lay-up position, then after assembly of support element 4b to support element 4c, and disassembly of support element 4b from support element 4a, the motors are controlled to bring the outer support elements back to the ends 14, 15 as shown in FIG. 18. In this maintenance position, an operator can carry out maintenance operations on the functional modules and associated reel of the main faces facing the functional elements 4b and 4a.

FIGS. 16, 17 and 18 illustrate the three maintenance positions of the support elements of the head that allow maintenance operations to be carried out on all functional modules and reels.

The use of two motors, in particular to return to the lay-up position between each maintenance position, makes it possible to carry out changes of position more quickly. Alternatively, the changeover from a maintenance position to the other is carried out using only one motor. In another embodiment, only one of the two support elements is motorized, and is used to carry out the different maintenance positions.

The axial locking of the reel 91a of the external support element 4a on its mandrel, and the axial locking of the reel 91b of the external support element 4d on its mandrel are ensured by specific locking means equipping the mandrels. For the other reels of the support elements, the axial locking is advantageously obtained thanks to the facing support element in the lay-up position, in particular thanks to the facing mandrels of the support elements.

Advantageously, one of the outer support elements 4a or 4d is connected to an electrical source, the assembly of the support elements to each other allows the electrical connection of the different support elements to the source, for example for the power supply of heating systems.

Figure 19:
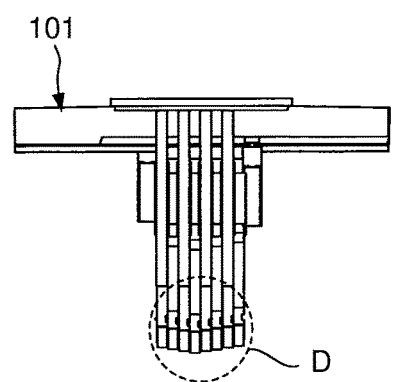
Figure 20:
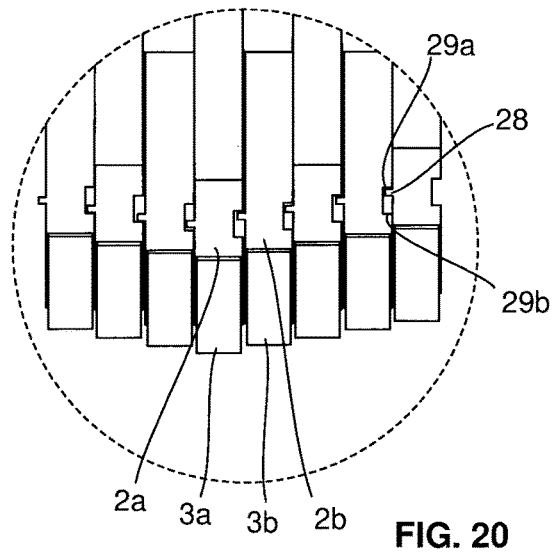
FIG. 20 is an enlarged view of detail D of FIG. 19.

FIGS. 19 and 20 show a head 101 according to a embodiment variant, which differs from head 1 described above in that it additionally comprises limiting means for limiting the relative strokes of two adjacent functional modules in compaction direction T2. Each functional module 2a, 2b comprises on one of its lateral faces a protruding finger 28 extending in the direction T1, and on its other lateral face a recess extending in the compaction direction and defining an upper stop 29a and a lower stop 29b. In the lay-up position, the finger of one functional module is positioned between the two stops of the recess of an adjacent module, and its recess receives between its two stops the finger of the other adjacent module. For the two externally located functional modules that are adjacent to only one other functional module, one includes only a finger that is positioned in the recess of the adjacent module, and the other includes only its recess that receives the finger of its adjacent module. The distance between the two stops defines the maximum relative stroke between two adjacent functional modules.

As an example, as shown in FIG. 20, when the functional module referenced 2a is urged towards its lower position to lay up a single fiber by means of this functional module, the functional modules on its right in FIG. 20 are also mechanically driven by their fingers resting against the corresponding upper stops, and the functional modules on its left are mechanically driven by their lower stops resting against resting against the corresponding fingers.

Although the invention has been described in connection with a particular embodiment, it is obvious that it is by no means limited to that embodiment and that it comprises all the technical equivalents of the means described as well as their combinations if they fall within the scope of the invention.

The invention claimed is:

1. A fiber application head for the production of composite material parts by application of bands formed of several continuous fibers arranged side by side, comprising a compaction system comprising several independent compaction rollers and compaction cylinders, and for each fiber, cutting means and rerouting means, comprising:
   for each of said several continuous fibers, the head comprises a functional module including the cutting means, the rerouting means and a compaction roller, each functional module is mounted so as to be movable in translation along a compaction direction on a support element of the head,
   a compaction cylinder is associated with each functional module for the displacement in translation of the functional module,
   said head further comprising heating means comprising an independent heating system associated with each compaction roller, said heating system being able to displace together with the functional module(s) associated with said compaction roller.

2. The application head according to claim 1, wherein the heating system is able to emit thermal radiation towards a nip area between the compaction roller and an application surface, in order to heat each fiber located on the compaction roller, before its compaction by the latter, as well as the application surface and/or one or more previously applied fibers.

3. The application head according to claim 1, wherein each heating system comprises one or more hot air torches, a laser type heating system, or a flash lamp type heating system.

4. The application head according to claim 1, wherein each heating system is mounted so as to be movable in translation in the compaction direction on the support element and is mechanically connected by at least one rigid arm to said functional module(s).

5. The application head according to claim 1, wherein each heating system is pivotally mounted on the support element and is mechanically connected by at least one connecting rod to said functional module(s).

* * * * *